US007653484B2

(12) United States Patent
Choi (10) Patent No.: US 7,653,484 B2
(45) Date of Patent: Jan. 26, 2010

(54) METHOD FOR DETERMINING DEVIATION OF A MOBILE OBJECT IN A NAVIGATION SYSTEM FROM A TRAVEL ROUTE

(75) Inventor: Hyun Woo Choi, Seongnam-si (KR)

(73) Assignee: LG Electronics Inc., Seoul (KR)

( * ) Notice: Subject to any disclaimer, the term of this patent is extended or adjusted under 35 U.S.C. 154(b) by 951 days.

(21) Appl. No.: 11/275,336

(22) Filed: Dec. 23, 2005

(65) Prior Publication Data
US 2006/0142940 A1 Jun. 29, 2006

(30) Foreign Application Priority Data
Dec. 27, 2004 (KR) .................. 10-2004-0112818

(51) Int. Cl.
*G01C 21/30* (2006.01)
*G01C 21/32* (2006.01)
(52) U.S. Cl. .................. 701/210; 701/202; 340/995.21; 340/988; 340/995.1
(58) Field of Classification Search ............... 701/202, 701/205, 208–210; 340/990, 995.1, 995.21, 340/988–992, 995.19, 995.25
See application file for complete search history.

(56) References Cited

U.S. PATENT DOCUMENTS 4,743,913 A * 5/1988 Takai .......................... 342/457

(Continued)

FOREIGN PATENT DOCUMENTS

EP 702209 A1 * 3/1996

JP 08086659 A * 4/1996
JP 08105754 A * 4/1996
JP 11149598 A * 6/1999

(Continued)

OTHER PUBLICATIONS

Interpretation of Spatial Language in a Map Navigation Task; Levit, M.; Roy, D.; Systems, Man, and Cybernetics, Part B, IEEE Transactions on; vol. 37, Issue 3, Jun. 2007 pp. 667-679 ; Digital Object Identifier 10.1109/TSMCB.2006.889809.*

(Continued)

*Primary Examiner*—Cuong H Nguyen
(74) *Attorney, Agent, or Firm*—Fish & Richardson P.C.

(57) ABSTRACT

A travel route stray discriminating method of a mobile object in navigation system is disclosed in which discrimination of travel route deviation is temporarily withheld even if the mobile object has deviated from the travel route on a busy road such as a cross-road, and a warning that the mobile object has deviated from the travel route is issued if it is accurately discriminated that the mobile object has strayed from the travel route. The method comprises: a controller searching for a travel route of a mobile object, discriminating a current location of the mobile object if the mobile object travels along the searched travel route and displaying on a display unit by matching the discriminated current location of the mobile object to a stored map data, and initially discriminating the deviation of the mobile object from the travel route by a link on which the mobile object travels, a travel angle of the mobile object and whether the mobile object has deviated from the link; the controller secondly and thirdly discriminating absence and presence of a guidance subject point based on the travel distance of the mobile object; and the controller controlling a sound signal generating unit and issuing a warning that the mobile object has deviated from travel route if the mobile object is thirdly discriminated to have deviated from the travel route.

18 Claims, 9 Drawing Sheets

U.S. PATENT DOCUMENTS

| | | | | |
|---|---|---|---|---|
| 4,924,402 | A * | 5/1990 | Ando et al. | 701/208 |
| 5,477,459 | A * | 12/1995 | Clegg et al. | 701/300 |
| 5,488,559 | A * | 1/1996 | Seymour | 701/208 |
| 5,523,765 | A * | 6/1996 | Ichikawa | 342/451 |
| 5,757,289 | A * | 5/1998 | Nimura et al. | 340/995.21 |
| 5,854,987 | A * | 12/1998 | Sekine et al. | 701/41 |
| 5,878,361 | A * | 3/1999 | Sekine et al. | 701/41 |
| 5,878,362 | A * | 3/1999 | Sekine et al. | 701/41 |
| 5,928,299 | A * | 7/1999 | Sekine et al. | 701/41 |
| 5,938,718 | A * | 8/1999 | Morimoto et al. | 701/201 |
| 6,067,502 | A * | 5/2000 | Hayashida et al. | 701/209 |
| 6,211,798 | B1 * | 4/2001 | Albrecht et al. | 340/990 |
| 6,333,702 | B1 * | 12/2001 | Hiyokawa et al. | 340/995.21 |
| 6,360,162 | B1 * | 3/2002 | Meis et al. | 701/117 |
| 6,438,491 | B1 * | 8/2002 | Farmer | 701/301 |
| 6,832,156 | B2 * | 12/2004 | Farmer | 701/301 |
| 7,340,341 | B2 * | 3/2008 | Adachi | 701/208 |
| 2003/0004644 | A1 * | 1/2003 | Farmer | 701/301 |
| 2006/0142940 | A1 * | 6/2006 | Choi | 701/210 |
| 2006/0155463 | A1 * | 7/2006 | Adachi | 701/208 |
| 2007/0005238 | A1 * | 1/2007 | Adachi | 701/209 |

FOREIGN PATENT DOCUMENTS

| | | | | |
|---|---|---|---|---|
| JP | | 2008268014 A | * | 11/2008 |
| KR | | 2006074169 A | * | 7/2006 |
| WO | WO 2006071044 A1 | | * | 7/2006 |

OTHER PUBLICATIONS

Sequence-Based Localization in Wireless Sensor Networks; Yedavalli, K.; Krishnamachari, B.; Mobile Computing, IEEE Transactions on; vol. 7, Issue 1, Jan. 2008 p. 81-94; Digital Object Identifier 10.1109/TMC.2008.4387797.*

Prediction of Transit Vehicle Arrival Time for Signal Priority Control: Algorithm and Performance; Chin-Woo Tan; Sungsu Park; Hongchao Liu; Qing Xu; Lau, P.; Intelligent Transportation Systems, IEEE Transactions on; vol. 9, Issue 4, Dec. 2008 pp. 688-696; Digital Object Identifier 10.1109/TITS.2008.2006799.*

Performance Evaluation of SUVnet With Real-Time Traffic Data; Hong-Yu Huang; Pei-En Luo; Minglu Li; Da Li; Xu Li; Wei Shu; Min-You Wu; Vehicular Technology, IEEE Transactions on; vol. 56, Issue 6, Part 1, Nov. 2007 pp. 3381-3396 Digital Object Identifier 10.1109/TVT.2007.907273.*

GPS moving performance on open sky and forested paths; Morales, Yoichi; Tsubouchi, Takashi; Intelligent Robots and Systems, 2007. IROS 2007. IEEE/RSJ International Conference on Oct. 29, 2007-Nov. 2, 2007 pp. 3180-3185 Digital Object Identifier 10.1109/IROS.2007.4399307.*

An Improved Method for GPS-Based Network Position Location in Forests; Hutchens, C.L.; Sarbin, B.R.; Bowers, A.C.; McKillican, J.D.G.; Forrester, K.K.; Buehrer, R.M.; Wireless Communications and Networking Conference, 2008. WCNC 2008. IEEE; Mar. 31, 2008-Apr. 3, 2008 pp. 273-277; Digital Object Identifier 10.1109/WCNC.2008.53.*

The Impact of Location Errors on Geographic Routing in Sensor Networks; Witt, M.; Turau, V.; Wireless and Mobile Communications, 2006. ICWMC '06. International Conference on; Jul. 29-31, 2006 pp. 76-76; Digital Object Identifier 10.1109/ICWMC.2006.87.*

Search-quality Tradeoffs for Routing in Non-ideal Wireless Networks; Buragohain, C.; Agrawal, D.; Suri, S.; Sensor and Ad Hoc Communications and Networks, 2006. SECON '06. 2006 3rd Annual IEEE Communications Society on; vol. 1, Sep. 28-28, 2006 pp. 10-19; Digital Object Identifier 10.1109/SAHCN.2006.288404.*

Improving position accuracy by combined processing of Galileo and GPS satellite signals; Engel, U.; Information Fusion, 2008 11th International Conference on; Jun. 30, 2008-Jul. 3, 2008 pp. 1-8; Digital Object Identifier 10.1109/ICIF.2008.4632457.*

Sideslip angles observer for vehicle guidance in sliding conditions: application to agricultural path tracking tasks; Lenain, R. et al.; Robotics and Automation, 2006. ICRA 2006. Proceedings 2006 IEEE International Conference on; May 15-16, 2006 pp. 3183-3188;Digital Object Identifier 10.1109/ROBOT.2006.1642186.*

* cited by examiner

METHOD FOR DETERMINING DEVIATION OF A MOBILE OBJECT IN A NAVIGATION SYSTEM FROM A TRAVEL ROUTE

BACKGROUND OF THE INVENTION

1. Field

The present document relates to a travel route stray discriminating method of a mobile object in a navigation system configured to discriminate whether a mobile object has diverted from a searched travel route to travel on a different travel route.

2. Description of the Related Art

Concomitant with the continuous increase of the number of mobile objects such as vehicles, traffic congestion is getting worsened these days. Particularly, traffic problems are aggravated as the increase of the number of mobile objects is faster than that of the expansion of infrastructures of roads and bridges.

One of the solutions worth noticing for addressing the traffic congestion is a navigation system.

Generally, a navigation system is such that at least four or more navigation messages are received by a Global Positioning System (GPS) receiver out of navigation messages periodically transmitted by a plurality of GPS satellites arranged on geostationary orbits over the Earth to detect 3D location coordinates of a mobile object. The location coordinates detected by the GPS receiver are determined as a current location of a mobile object, and the detected current location of the mobile object is map-matched on a digital map so that the digital map and the location of the mobile object can be displayed on a display screen.

Furthermore, the navigation system searches a travel route from a current location of a mobile object to a destination, and guides a user to steer a mobile object along the searched travel route. Therefore, if the navigation system is used, there is an advantage in that a travel route of a mobile object can be searched and guided to allow using a given road network effectively.

If there is positioned a cross section in front of a traveling mobile object, or there is located a guidance subject matter such as a highway, or a leading route to an interchange of a highway or a freeway, the navigation system searches for those subject matters.

If a mobile object approaches within a predetermined distance of the searched guidance subject matter, the navigation system guides via a voice signal a travel route of the mobile object at a location of the guidance subject matter. Furthermore, the navigation system discriminates whether the mobile object has diverted from the searched travel route to other travel routes, and if the travel routed has been diverted, the navigation system informs a user of the diversion of the travel route and enables the mobile object to travel on an accurate travel route.

Figure 1A:
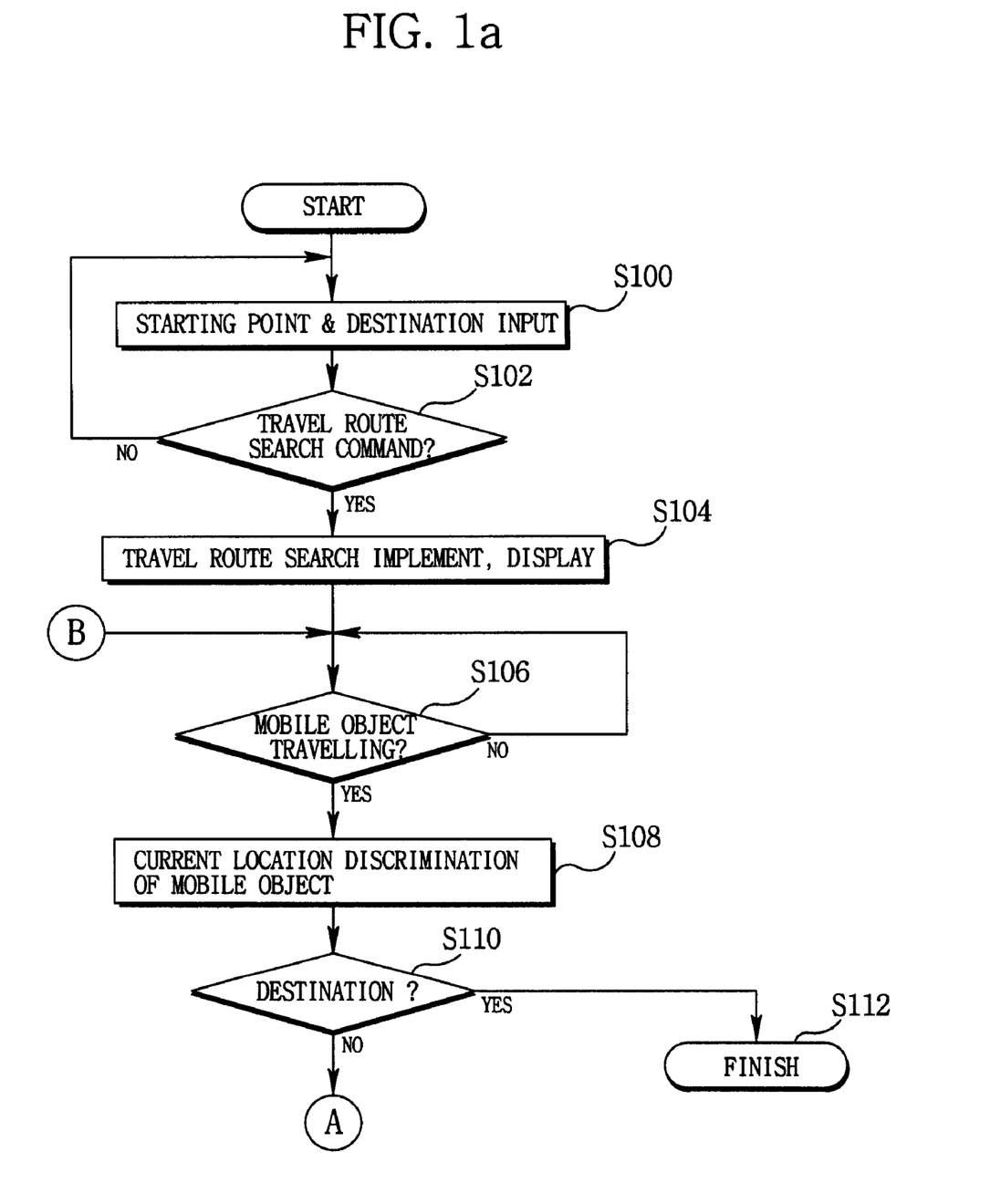
FIG. 1 is a flowchart illustrating a travel route deviation discriminating method according to the prior art.
Figure 1B:
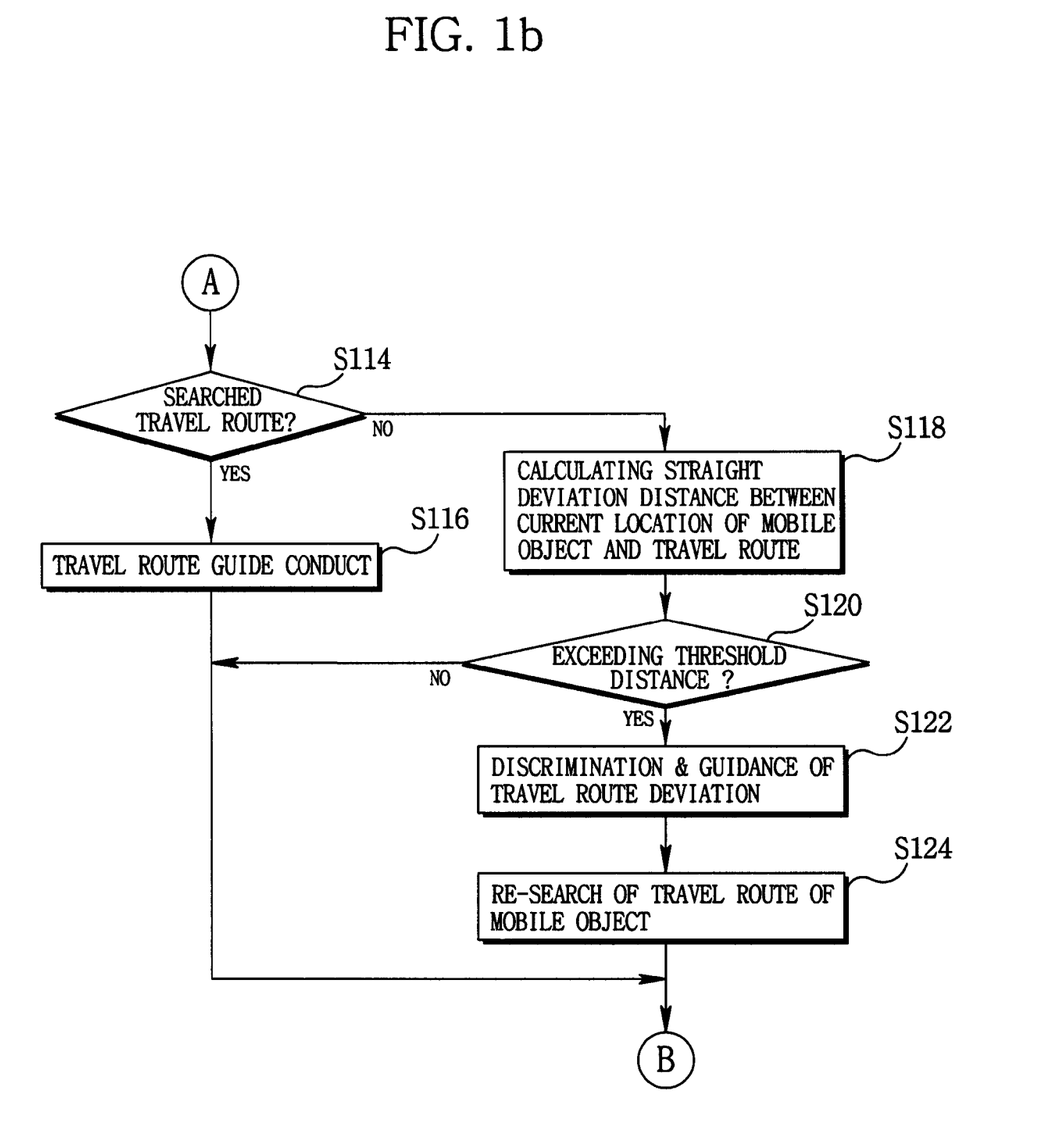

FIGS. 1a and 1b are signal flow charts illustrating an operation of a navigation system of a mobile object whether a mobile object has diverted from a searched travel route.

First of all, a user of a navigation system inputs a starting point and a destination of a mobile object (S100), and instructs the navigation system to search a travel route (S102). The navigation system then searches the start point to the destination on the travel route and displays the searched travel route on a display screen to allow the user to check the searched travel route (S104).

If the mobile object travels (S106), the navigation system discriminates a current location of the mobile object by using a navigational method in which navigational messages received by GPS receiver and a travel status detection signal of the mobile object detected by a sensor mounted at the mobile object are mixed (S108). The navigation system then discriminates whether the current location of the mobile object thus discriminated at S108 is a destination (S110).

As a result of the discrimination if the current location of the mobile object is the destination, the navigation system completes a guidance operation of the travel route (S112). If the current location is not the destination as a result of the discrimination, the navigation system discriminates whether the current location of the mobile object is on the searched travel route (S114).

As a result of discrimination at S114, if the current location of the mobile object is not situated on the searched travel route, and is diverted therefrom, the navigation system calculates a diverted straight distance between the current location of the diverted mobile object and the travel route (S118). If the strayed straight distance is calculated, the navigation system discriminates whether the calculated diverted straight distance exceeds a predetermined set threshold distance (S120).

As a result of the discrimination, if the diverted straight distance is less than the threshold, the navigation system discriminates that the mobile object has not strayed from the travel route, and flow returns to S108, and the navigation system searches for the current location of the mobile object and repeats the operations of discriminating whether the mobile object has arrived at the destination and strayed from the travel route.

As a result of the discrimination at S120, if the diverted straight distance exceeds the threshold distance, the navigation system discriminates that the mobile object has strayed from the travel route, and outputs a voice signal and guides the diversion of the travel route (S122). Furthermore, the navigation system re-searches for the travel route of the mobile object from the diverted location and repeats the operations of discriminating whether the mobile object has arrived at the destination and strayed from the travel route.

The technique thus described according to the prior art uses only the straight distance diverted from the travel route to discriminate whether the mobile object has strayed from the travel route. Consequently, even if the mobile object travels along a travel route at a congested area such as a crossroad and the like, the navigation system discriminates that the mobile object has strayed from the travel route, and generates an error of issuing a warning that the mobile object has strayed from the travel route. As a result, the navigation system has caused an inconvenience to the user's safe driving.

Still worse, if a mobile object strays from a given travel route to travel a road within a threshold distance, for example, if the mobile object travels on a road in parallel with the travel route and within the threshold distance, the navigation system generates an error of not discriminating that the mobile object has strayed from the travel route.

SUMMARY OF THE INVENTION

It is an object of the present invention to provide a travel route stray discriminating method of a mobile object in a navigation system configured to accurately discriminating whether a mobile object has diverted from a searched travel route.

Another object of the present invention is to temporarily hold the discrimination of a deviated travel route even if a mobile object deviates from the travel route at a complicated link such as a cross road and the like so that a user can safely drive the mobile object.

In accordance with the aspects of the present invention, a mobile object uses a link over which the mobile object travels, a travel angle of the mobile object and whether the mobile object has deviated from the link to initially discriminate whether the mobile object has strayed from a travel route. A second discrimination of deviation from the travel route of the mobile object is implemented by absence and presence of guidance subject matter following the initial discrimination of the deviation of the travel route. A third discrimination of deviation from the travel route is implemented by using a travel distance covered by the mobile object from a location of second discrimination of deviation from the travel route following the second discrimination of deviation from the travel route. Then, the deviation of the travel route is guided if the deviation from the travel route of the mobile object is confirmed by the third discrimination.

In accordance with the object of the present invention, the method comprises: a controller searching for a travel route of a mobile object and discriminating a current location of the mobile object if the mobile object travels along the searched travel route and displaying on a display unit by matching the discriminated current location of the mobile object to a stored map data; the controller discriminating the deviation of travel route of the mobile object by a link over which the mobile object is traveling, a traveling angle of the mobile object, whether the mobile object has deviated from the link situated on the travel route, absence and presence of guidance subject point within a set distance based on the current location of the mobile object and a straight distance deviated from the travel route; and the controller issuing a warning that the mobile object has deviated from the travel route if it is discriminated that the mobile object has deviated from the travel route.

The search of the travel route comprises: receiving a starting point and a destination of the mobile object; and the controller using the map data according to a search command of the travel route to search the travel route from the starting point to the destination.

The starting point of the mobile object is a current location of the mobile object discriminated by the controller via a mixed navigation using navigation messages received by a GPS receiver and a travel status detection signal of the mobile object detected by a sensor.

The current location discrimination of the mobile object is implemented by the controller via the mixed navigation using navigation messages received by a GPS receiver and a travel state detection signal of the mobile object detected by a sensor.

The discriminating step of deviation of the travel route comprises: discriminating whether the mobile object has deviated from the travel route via a link over which the mobile object travels, a travel angle of the mobile object and whether the mobile object has deviated from the link located on the travel rout of the mobile object (initial discrimination); discriminating whether a guidance subject matter is absent or present within a set distance based on the current location of the mobile object following the initial discrimination of the deviation of the travel route (second discrimination); and discriminating the deviation from the travel route by a travel distance covered by the mobile object from a location of second discrimination of deviation from the travel route following the second discrimination of deviation from the travel route (final discrimination).

The initial discriminating step of the deviation from the travel route comprises: discriminating as the mobile object having deviated from the travel route by cases where a link on which the mobile object is currently located is not the link located on the searched travel route, where an angle difference between the travel angle of the mobile object and a link angle of the travel route exceeds a set angle, or the mobile object has deviated from the link of the searched travel route; and setting as 1 the deviation discrimination degree following the discrimination of deviation from the travel route.

The second discriminating step of the deviation from the travel route comprises: discriminating whether the guidance subject point is present within the set distance based on the current location of the mobile object; discriminating a distance from the current location of the mobile object to the guidance subject point if the guidance subject point is present as a result of the discrimination; and second time discriminating the deviation from the travel route if there is no guidance subject point, the distance from the current location of the mobile object to the guidance subject point exceeds the set distance as a result of the discrimination.

BRIEF DESCRIPTION OF DRAWINGS

The above aspects and other features of the present invention will become more apparent by describing in detail exemplary embodiments thereof with reference to the attached drawings, wherein;

FIGS. 4a and 4b are signal flowcharts illustrating a deviation discriminating method of FIG. 3a.

DETAILED DESCRIPTION OF THE INVENTION

Figure 2:
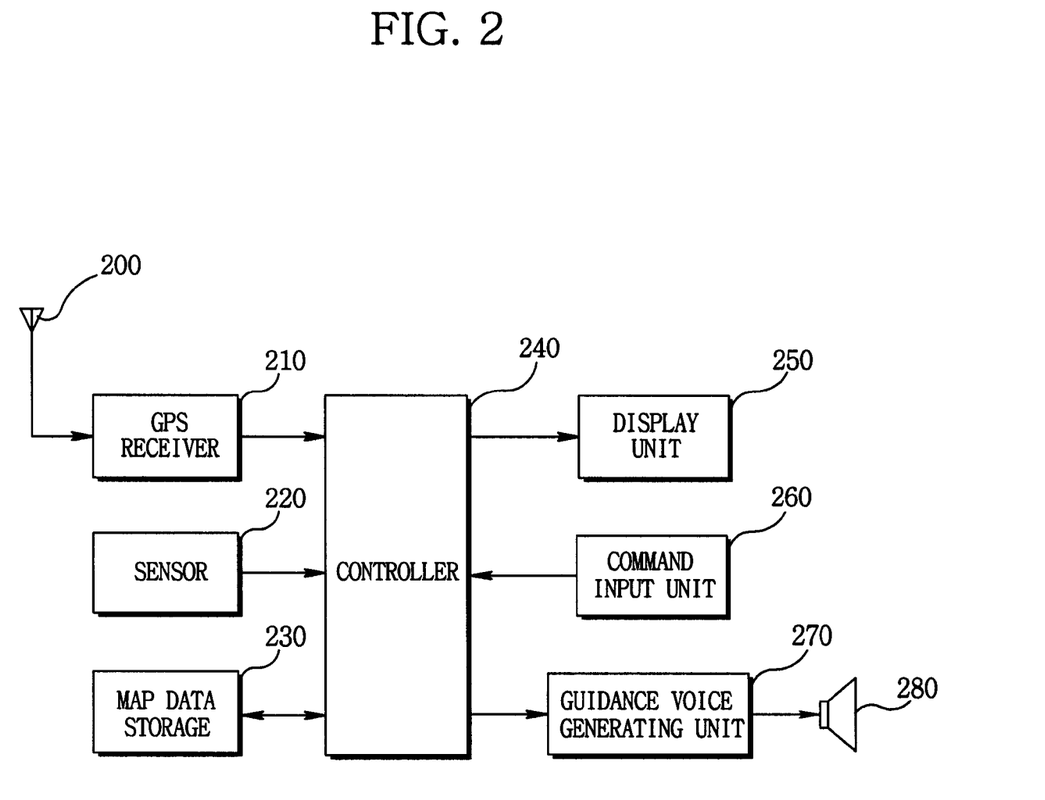
FIG. 2 is a block diagram illustrating a construction of a navigation system to which a travel route deviation discriminating method is applied according to an embodiment of the present invention.

FIG. 2 is a block diagram illustrating a construction of a navigation system to which a travel route deviation discriminating method is applied according to an embodiment of the present invention, where reference numeral 200 is an antenna and 210 is a GPS receiver.

The GPS receiver (210) is a GPS receiver receiving navigation messages transmitted from a plurality of GSP satellites (not shown) via the antenna (200).

Reference numeral 220 is a sensor. The sensor (220), disposed with various sensors including a gyroscope for detecting a travel angle of a mobile object and a speed sensor for detecting a travel speed of the mobile object, serves to detect a travel status in response to the travel of the mobile object.

Reference numeral 230 is map data storage. The map data storage (230) is stored in advance with a map data for searching for the travel route of the mobile object and guiding the mobile object.

Reference numeral 240 is a controller. The controller (240) discriminates a current location of the mobile object via a mixed navigation method using navigation messages received by the GPS receiver and a travel status detection signal of the mobile object detected by the sensor. Furthermore, the controller (240) uses the map data stored in the map data storage (230) to search for a travel route from a starting point to a destination of the mobile object. The controller (240) displays the discriminated current location of the mobile object by matching it to the map data, and guides the mobile object along the searched travel route if the mobile object travels.

Reference numeral 250 is a display unit. The display unit (250) functions to display on a display screen (not shown) a map data, a current location of the mobile object and a travel route of the mobile object in response to the control of the controller (240).

Reference numeral 260 denotes a command input unit for generating an operation command in response to manipulation of a user and inputting the command to the controller (240).

Reference numeral 270 denotes a guidance voice generating unit. The guidance voice generating unit (270) creates a predetermined guidance voice signal for guiding the travel of the mobile object in response to the control of the controller (240). The guidance voice generating unit (270) serves to output the created guidance voice signal to a speaker (280) and guides the travel route of the mobile object for a user of the mobile object.

Figure 3A:
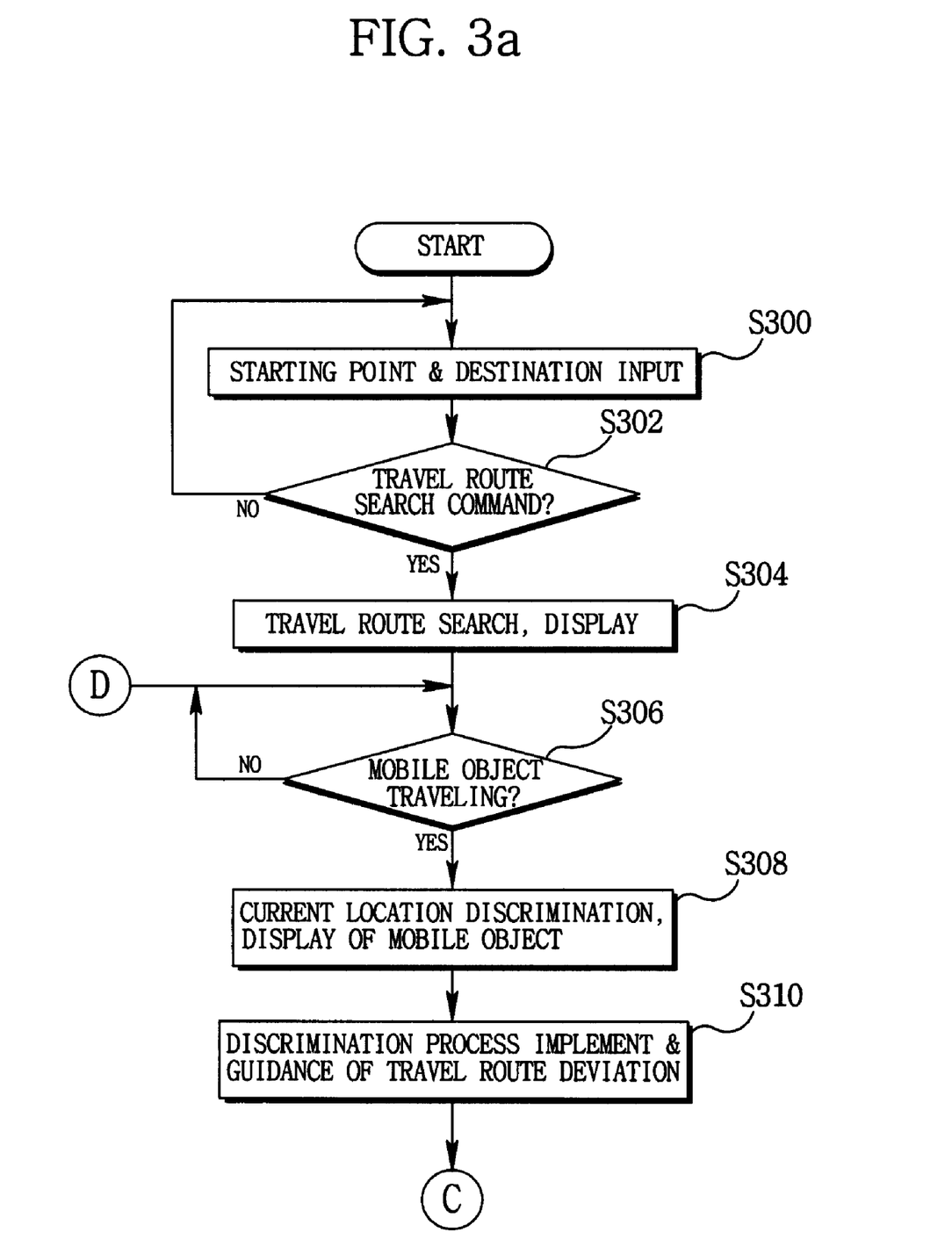
FIGS. 3a and 3b are signal flowcharts illustrating a travel route deviation discriminating method according to the embodiment of the present invention.
Figure 3B:
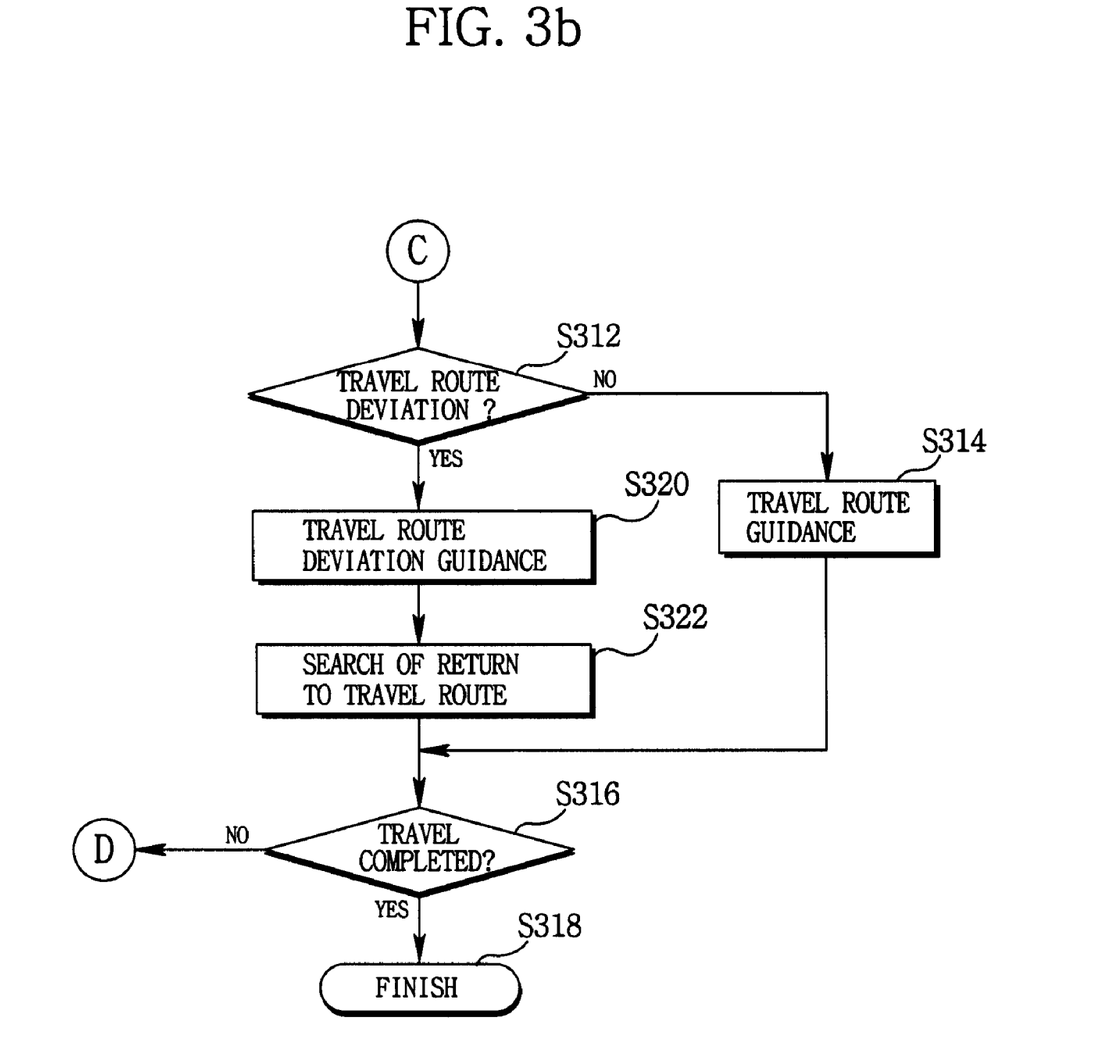

FIGS. 3a and 3b are signal flowcharts illustrating a travel route deviation discriminating method according to the embodiment of the present invention.

First of all, a user of the mobile object manipulates the command input unit (260) before traveling the mobile object to input a starting point and a destination of the mobile object (S300) and instructs the search for the travel route of the mobile object (S302).

The starting point may be set as a current location discriminated by the controller (240) via the mixed navigation method using navigation messages received by the GPS receiver and the travel status detection signal of the mobile object detected by the sensor.

In other words, In other words, the GPS receiver (210) receives navigation messages transmitted by at least four GPS satellites among the navigation messages transmitted by a plurality of GPS satellites to detect a current position of a mobile object. The GPS receiver (210) also calculates a value of DOP (Dilution of Precision) which is a geometric error relative to the relationship of arrangement of the GPS satellites transmitting the navigation messages used for detecting the current position of the mobile object based on a position of the GPS receiver (210). In other words, the DOP is a parameter that indicates the probabilities of measured coordinates based on geometric configurations of used satellites with regard to a mobile object. For example, if the GSP satellites are evenly arranged based on the position of a GPS receiver, the value of the DOP is low, while the value of the DOP is high if the GPS satellites are not uniformly arranged. The controller (240) compares the value of the DOP outputted by the GPS receiver (210) with a preset threshold to discriminate the credibility of the navigation messages. As a result of the discrimination, if there is credibility, the current location of the mobile object is detected by the navigation messages. If there is no credibility, the current location of the mobile object is detected from a final location of the mobile object detected by the navigation messages having the credibility using a mixed navigation where a detection signal of the sensor (320) is used. The current location of the mobile object detected by the mixed navigation may be set as the starting point of the mobile object at S402.

The controller (240) uses the map data stored in the map data storage (230) to search for the travel route of the mobile object from the starting point to the destination in response to the search command of the travel route, and the searched travel route is displayed on the display screen of the display unit (260) for a user to check (S304).

If the mobile object travels under the travel route of the mobile object being searched (S306), the controller (240) discriminates the current location of the mobile object by the mixed navigation where the navigation messages received by the GPS receiver (210) and the travel status detection signal of the mobile object detected by the sensor (220) are used. The controller (240) matches the discriminated current location of the mobile object to the map data, and outputs it to the display unit (250) so that the map and the current location of the mobile object are simultaneously displayed on the display screen (S308).

Successively, the controller (240) implements a travel route deviation discrimination process of discriminating whether the thus-discriminated current location of the mobile object has deviated from the searched travel route of the mobile object (S310). Furthermore, the controller (240) discriminates whether the mobile object has deviated from the searched travel route as a result of the implementation of the travel route deviation discrimination process (S312).

As a result of the discrimination, if the mobile object has not deviated from the travel route, the controller (240) conducts a guidance operation of the travel route so that the mobile object can travel along the searched travel route (S314). The controller (240) discriminates whether the mobile object has completed the travel to the destination (S316). If it is discriminated that the mobile object has completed the travel to the destination, the controller (240) finishes the operation of guiding the mobile object to along the travel route (S318). If the mobile object has not completed the travel to the destination, the controller (240) returns to S306 to discriminate the current location relative to the travel of the mobile object and repeats the operations of discriminating whether the mobile object has deviated from the travel route.

As a result of the discrimination at S312, if the mobile object has deviated from the travel route, the controller (240) controls the guidance voice generating unit (270) to create a guidance voice signal warning that the mobile object has deviated from the travel route, and outputs the created voice signal to the speaker (280) warning to the user that the mobile object has strayed from the travel route (S320).

Successively, the controller (240) searches for a return travel route on which the mobile object can return to the searched travel route from the current location (S322). The controller (240) also discriminates whether the mobile object has completed the travel to the destination (S316). If the mobile object has completed the travel to the destination, the controller (240) finishes the operation (S318). If the mobile object has not completed the travel to the destination, the controller returns to S306 to discriminate the current location relative to the travel of the mobile object and repeats the operations of discriminating whether the mobile object has diverted from the travel route.

Figure 4A:
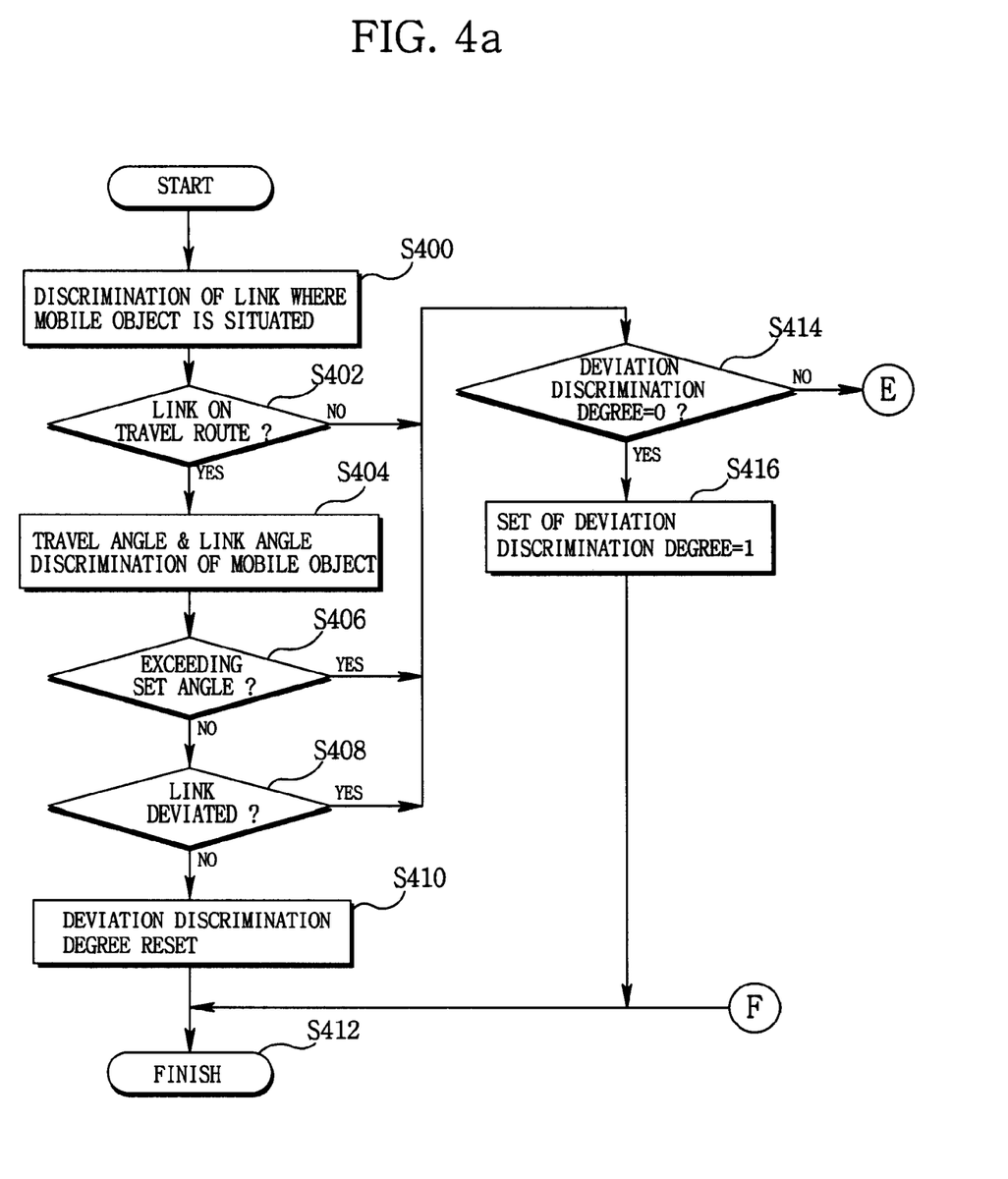
Figure 4B:
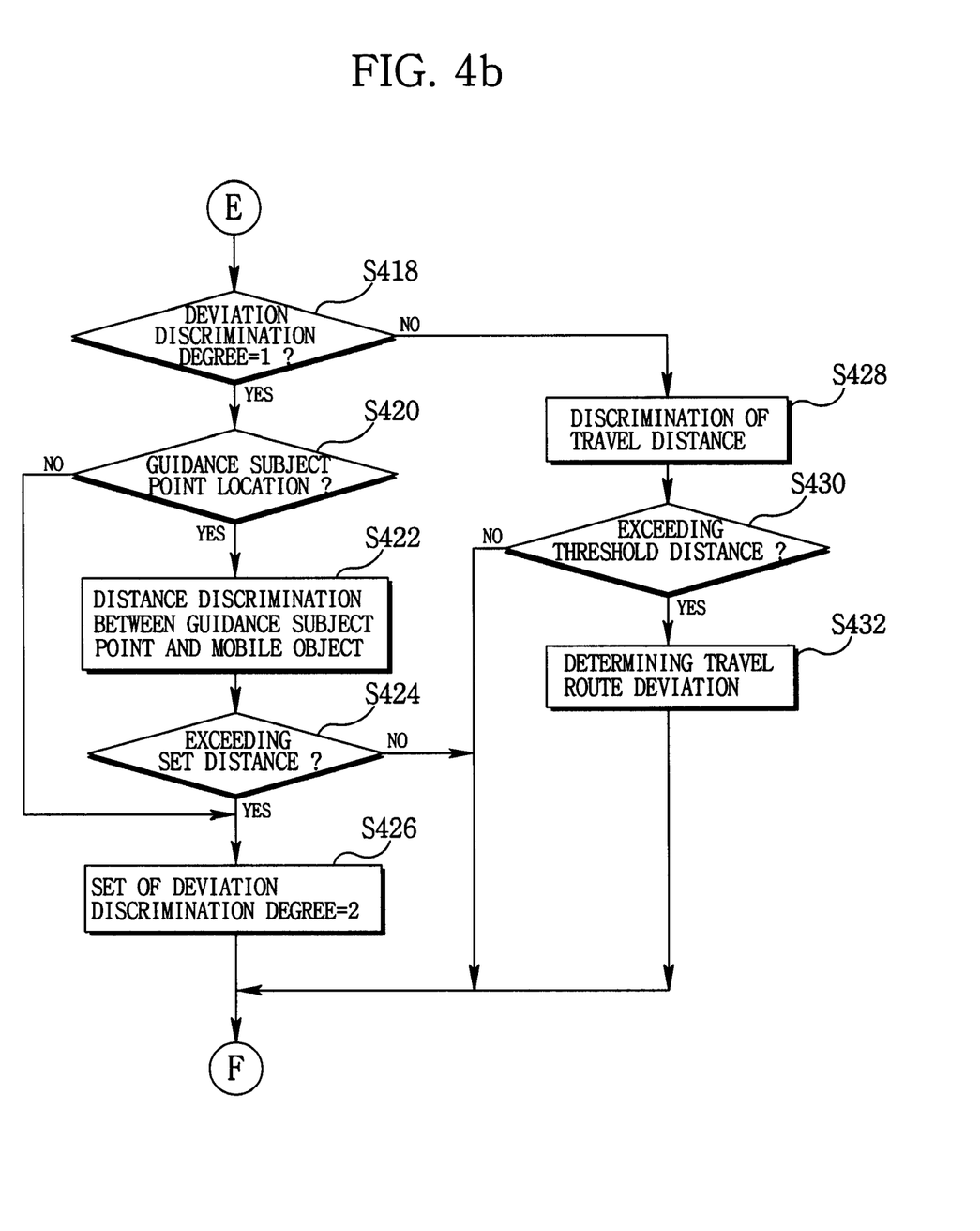

The travel route deviation discrimination process of S310 is illustrated in FIGS. 4 and 4b, where the controller (240) discriminates a link over which the mobile object is currently located (S400). The controller (240) discriminates whether the discriminated link is a link located on the searched travel route (S402).

As a result of the discrimination, if the link on which the mobile object is currently located is a link located on the searched travel route, the controller (240) uses the detected signal of the sensor (220) to discriminate a current travel angle of the mobile object, and uses the map data stored in the map data storage (230) to discriminate an angle of the link on which the mobile object is situated (S404). If the current travel angle of the mobile object and the angle of the link are discriminated, the controller (240) compares the discriminated travel angle of the mobile object with the angle of the link (S406).

As a result of the discrimination if an angle difference between the travel angle of the mobile object and the angle of the link do not exceed a preset angle, the controller (240) discriminates whether the mobile object has deviated from the link on the travel route (S408). As a result of the discrimination, if the mobile object has not deviated from the link on the travel route, the controller (240) discriminates that the mobile object has not strayed from the travel route, and re-set the discrimination degree to finish the travel route deviation discrimination process (S412).

Furthermore, the controller (240) discriminates the currently-set deviation discrimination degree of the mobile object (S414. S416) if, as a result of the discrimination at S402, the link on which the mobile object is located is not the link on the searched travel route, or if, as a result of comparative discrimination at S406, the angle difference between the travel angle of the mobile object and the angle of the link exceeds the preset angle, or if, as a result of discrimination at S408, the mobile object has deviated from the link.

Figure 5A:
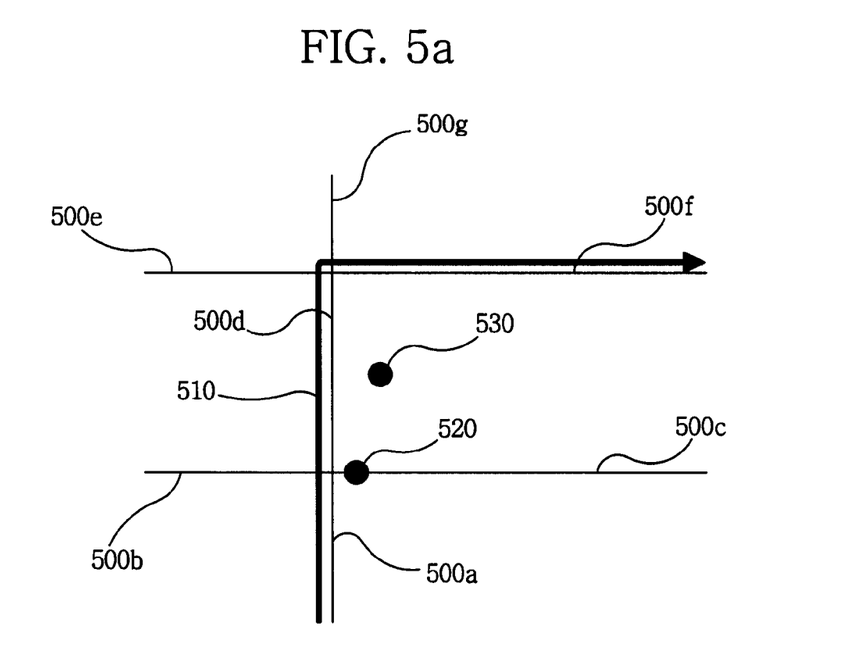
FIGS. 5a, 5b and 5c are drawings illustrating description of first, second and final third deviation discriminating operations in the travel route deviation discriminating method according to the embodiment of the present invention.

As a result of discrimination at S414, if the currently-set deviation discrimination degree is 0, the controller (240) sets at 1 the deviation discrimination degree of the mobile object (S416) to finish the travel route deviation discrimination process (S414). For example, it is assumed that a travel route (510) is searched for the mobile object to travel on links (500*a*, 500*d*. 500*f*) as illustrated in FIG. 5*a*. The controller (240) discriminates that the mobile object has deviated from a travel route (510) and set as 1 the deviation discrimination degree in case of the deviation discrimination degree being 0, if a current location (529) of the mobile object is on a link (500*c*) instead of links (500*a*. 500*d*. 500*f*) on the travel route (510), or if the angle difference between the travel angle of the mobile object and angle of links (500*a*. 500*d*) exceeds the preset angle, or if the mobile object is situated on a location (530) deviated from links (500*a*~500*f*).

Under a state that the deviation discrimination frequency being set at 1, if the travel route deviation is confirmed by conducting again the travel route deviation discrimination process, the controller (240) discriminates that the currently-set deviation discrimination degree is 1 (S418). Furthermore, the controller (240) discriminates whether a guidance subject point is situated within a set radius from the current location of the mobile object (S420). In other words, the controller (240) discriminates whether a guidance subject point is situated within the set distance from the current location of the mobile object, where the guidance subject point is a place where the travel of the mobile object should be guided by a guidance voice signal due to reason of the mobile object having to change the travel direction.

As a result of the discrimination, if no guidance subject location is situated within the set distance from the current location of the mobile object, the controller (240) sets the deviation discrimination degree at 2 (S426). As a result of the discrimination, if the guidance subject location is situated within the set distance from the current location of the mobile object, the controller (240) discriminates a distance between the guidance subject point and the mobile object (S422), and discriminates whether the discriminated distance exceeds the preset distance (S424).

Figure 5B:
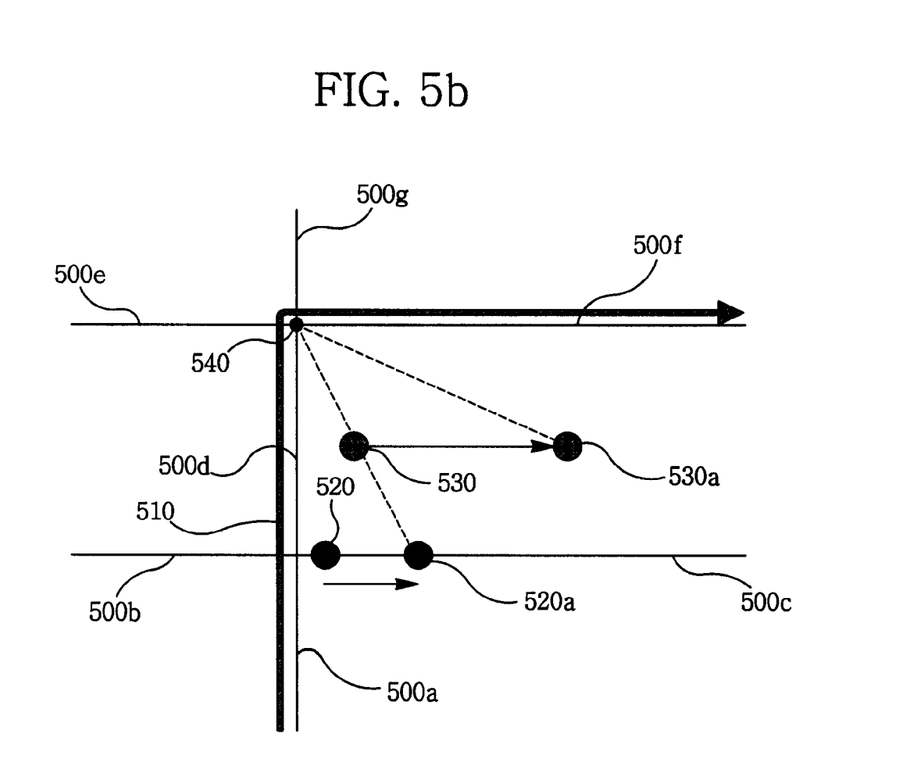

If the distance between the guidance subject point and the mobile object exceeds the preset distance, the controller (240) sets the deviation discrimination degree at 2 (S426). For example, as illustrated in FIG. 5*b*, if it is assumed that the mobile object has continuously traveled to reach a predetermined location (520*a*. 530*a*) from the location (520. 530) set at 1 as the deviation discrimination degree, the controller (240) sets the deviation discrimination degree at 2 if the guidance subject point (540) is not situated within the preset radius from the locations (520*a*. 530*a*). Furthermore, if the distance between a guidance subject point (540) and the current location (520*a*. 530*a*) of the mobile object exceeds the predetermined distance, the controller (240) sets the deviation discrimination degree at 2.

Under a state where the deviation discrimination degree is set at 2, and if the travel route deviation discrimination process is implemented to discriminate that the mobile object has deviated from the travel route, the controller (240) checks if the deviation discrimination degree is set at 2 (S418), and calculates a travel distance between the location (520*b*. 530*b*) where the mobile object has continuously traveled and the location (520*a*. 530*a*) of the mobile object where the deviation discrimination degree is set at 2 (S428).

Furthermore, a comparison is made between the erstwhile calculated distance and the preset threshold distance (S430), and if the traveled distance of the mobile object exceeds the threshold distance, the controller (240) decides that the mobile object has deviated from the travel route (S432), and guides the travel route deviation to the user.

Figure 5C:
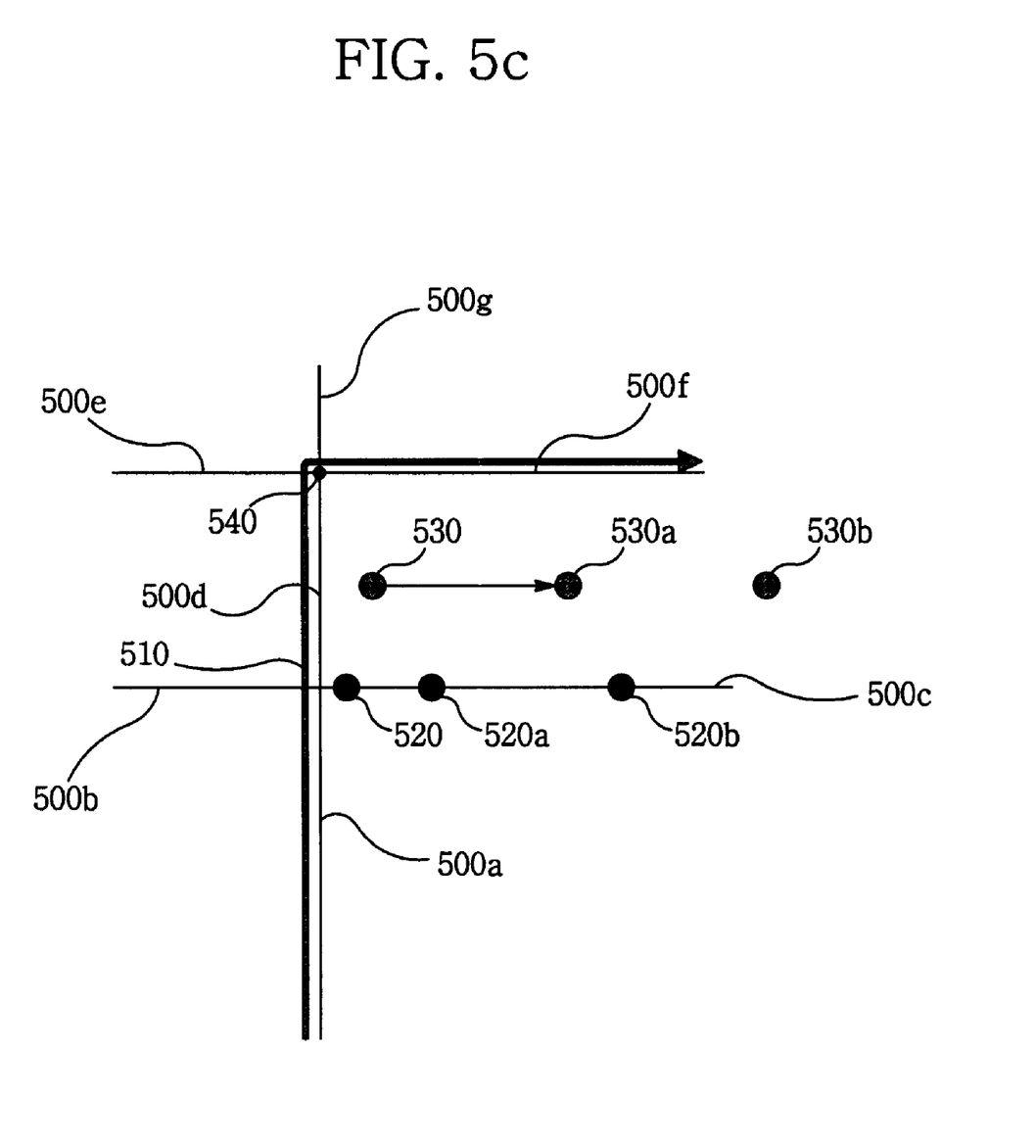

For example, as illustrated in FIG. 5*c*, if the distance between the location (520*b*. 530*b*) where the mobile object has continuously traveled and the location (520*a*. 530*a*) of the mobile object where the deviation discrimination degree is set at 2 exceeds the preset threshold distance, the controller (240) discriminates that the mobile object has deviated from the travel route and guides the travel route deviation of the mobile object to the user.

As apparent from the foregoing, the present invention initially discriminates a link which a mobile object travels on, a travel angle of the mobile object and travel route deviation of the mobile object using deviation of the link. Following the initial discrimination of the travel route deviation, absence and presence of guidance subject point and travel distance of the mobile object are used to discriminate the second and third discriminations, such that the present invention can help discriminate the travel route deviation of the mobile object accurately.

Furthermore, the present invention can guide a user of the mobile object by accurately discriminating the travel route deviation of the mobile object on a busy road such as an intersection, and reduce the error of wrongly discriminating the deviation of the mobile object to a minimum.

While the invention has been shown and described with reference to certain exemplary embodiments thereof, it will be understood by those skilled in the art that various changes in form and details may be made therein without departing from the spirit and scope of the invention as defined by the appended claims.

What is claimed is:

1. A method for determining a deviation of a mobile object from a travel route within a navigation system, wherein the navigation system includes a controller, the method comprising:

searching a travel route of the mobile object and determining a current location of the mobile object with the controller;

displaying the travel route on a display unit by matching the determined current location of the mobile object with stored map data;

determining the deviation of the mobile object from the travel route with the controller, wherein determining the deviation of the mobile object includes referencing a link situated on the travel route over which the mobile object is traveling, a traveling angle of the mobile object, a deviation from the link situated on the travel route, one or more reference points within a set distance of the current location of the mobile object, and a straight-line distance deviation from the travel route; and providing a warning if the mobile object has deviated from the travel route.

2. The method as defined in claim 1, wherein searching the travel route comprises receiving a starting point and a destination point of the mobile object.

3. The method as defined in claim 2, wherein searching the travel route comprises using the map data to search the travel route from the starting point to the destination point.

4. The method as defined in claim 2, wherein the starting point of the mobile object is an actual location of the mobile object determined by the controller with a mixed navigation using navigation messages received by a GPS receiver and a travel status detection signal of the mobile object detected by a sensor.

5. The method as defined in claim 4, wherein the sensor provides a travel angle of the mobile object.

6. The method as defined in claim 4, wherein the sensor provides a travel speed of the mobile object.

7. The method as defined in claim 1, wherein the current location of the mobile object is determined by the controller with a mixed navigation using navigation messages received by a GPS receiver and a travel status detection signal of the mobile object detected by a sensor.

8. The method as defined in claim 7, wherein the sensor provides a travel angle of the mobile object.

9. The method as defined in claim 7, wherein the sensor provides a travel speed of the mobile object.

10. The method as defined in claim 1, wherein determining the deviation of the mobile object from the travel route comprises:

an initial determination of whether the mobile object has deviated from the travel route the link situated on the travel route over which the mobile object travels, a travel angle of the mobile object and whether the mobile object has deviated from the link located on the travel route of the mobile object;

a second determination of whether a reference point is absent or present within a set distance based on the current location of the mobile object following the initial determination of the deviation of the travel route; and a third determination of whether the deviation from the travel route by a travel distance covered by the mobile object from a location of the second determination.

11. The method as defined in claim 10, wherein the initial determination of the deviation from the travel route comprises determining if the mobile object has deviated from the travel route by referencing a link on which the mobile object is currently located, and verifying if the link on which the mobile object is currently located is located on the searched travel route.

12. The method as defined in claim 11, wherein the initial determination of the deviation comprises:

determining an angle difference between the travel angle of the mobile object and a link angle of the travel route; and comparing the angle difference with a threshold angle.

13. The method as defined in claim 11, wherein the initial determination of the deviation comprises determining if the mobile object has deviated from the link of the travel route in excess of a threshold distance.

14. The method as defined in claim 12, wherein the initial determination of the deviation comprises assigning a deviation determination degree after determining the deviation of the mobile object from the travel route.

15. The method as defined in claim 14, further comprising re-setting the deviation determination degree if it is determined that the mobile object has not deviated from the travel route as a result of the initial determination.

16. The method as defined in claim 11, wherein the second determination of the deviation from the travel route comprises: determining whether the one or more reference points is present within the set distance based on the current location of the mobile object;

determining a distance from the current location of the mobile object to the one or more reference points are present; and determining the deviation from the travel route if the one or more reference points are not present.

17. The method as defined in claim 1, wherein the link is a portion of a roadway situated within the travel route.

18. A navigation system configured for determining a deviation of a mobile object from a travel route within the navigation system, wherein the navigation system comprises:

a controller, the controller being configured to search a travel route of the mobile object and determine a current location of the mobile object with the controller;

a database containing stored map data; and a display unit for displaying the travel route, wherein the controller is configured to match the determined current location of the mobile object with the stored map data within the stored map database;

wherein the controller is configured to determine the deviation of the mobile object from the travel route, wherein determining the deviation of the mobile object includes referencing a link situated on the travel route over which the mobile object is traveling, a traveling angle of the mobile object, a deviation from the link situated on the travel route, one or more reference points within a set distance of the current location of the mobile object, and a straight line distance deviation from the travel route; and the controller is configured for providing a warning if the mobile object has deviated from the travel route.

* * * * *